United States Patent [19]

Takahashi et al.

[11] 4,420,711
[45] Dec. 13, 1983

[54] CIRCUIT ARRANGEMENT FOR DIFFERENT COLOR LIGHT EMISSION

[75] Inventors: Soichi Takahashi, Tokyo; Susumu Kobayashi, Ebina, both of Japan

[73] Assignee: Victor Company of Japan, Limited, Yokohama, Japan

[21] Appl. No.: 387,432

[22] Filed: Jun. 11, 1982

[30] Foreign Application Priority Data

Jun. 15, 1981 [JP] Japan .............................. 56-87718[U]

[51] Int. Cl.³ .............................................. H05B 37/02
[52] U.S. Cl. .................................... 315/296; 315/201; 315/208; 315/324; 340/704; 340/782
[58] Field of Search ................ 315/201, 208, 291, 296, 315/312, 324; 307/242, 311; 362/800; 340/701, 704, 762, 782

[56] References Cited

U.S. PATENT DOCUMENTS 4,298,869 11/1981 Okuno .................................. 340/782
4,348,616 9/1982 Tanaka et al. .................... 315/201 X

OTHER PUBLICATIONS

Lyons et al., *Light-Emitting Diode Circuit*, IBM Technical Disclosure Bulletin, vol. 14, No. 12, May 1972, p. 3580.

*Primary Examiner*—Eugene R. Laroche
*Attorney, Agent, or Firm*—Lowe, King, Price & Becker

[57] ABSTRACT

A circuit arrangement for different color light emission, comprises first series circuit of a first light-emitting element having a given color, a diode, and a resistor; and a second series circuit of a second light-emitting element having another color and a collector-emitter path of a transistor, where the transistor is responsive to an input control signal so as to change a current flowing therethrough. The first and second series circuits are connected in parallel and are interposed between two terminals of a power source. The impedance of the first series circuit is selected to be much greater than that of the second series circuit when the transistor is conductive. When the voltage of the input control signal is below a predetermined level, the transistor is kept nonconductive so that only the first light-emitting element is energized. As the voltage of the input control signal exceeds the predetermined level, a current start flowing through the transistor to cause both the first and second light-emitting elements to emit light. As the voltage further rises, only the second light-emitting element is energized. The different color light from the two light-emitting elements may be mixed to produce third color light.

6 Claims, 2 Drawing Figures

CIRCUIT ARRANGEMENT FOR DIFFERENT COLOR LIGHT EMISSION

BACKGROUND OF THE INVENTION

This invention relates generally to a circuit arrangement for different color light emission, and more particularly, this invention relates to a device for selectively emitting different color light in accordance with an input control signal.

As a conventional device for emitting different color light in accordance with an input signal, is known a circuit employing three transistors and two light-emitting diodes of difference colors such as red and green. With such a conventional device, one of red and green light rays can be emitted in response to an input control signal. Namely, in the presence of a low-voltage control signal, one of the red and green light-emitting diodes is energized while the other light-emitting diode is kept deenergized, and on the other hand, in the presence of a high-voltage control signal the light-emitting diodes are switched so that energization thereof is inversed.

With such a conventional light-emitting device it has been impossible to simultaneously energize both the light-emitting elements, and only two color light rays can be obtained with two light-emitting diodes, while the circuit arrangement for controlling the energization of these light-emitting diodes is rather complex.

SUMMARY OF THE INVENTION

The present invention has been developed in order to remove the above-described drawbacks inherent to the conventional light-emitting device for emitting more than one color light in response to an input control signal.

It is, therefore, an object of the present invention to provide a simple circuit arrangement for light emission with which one or both of two light-emitting elements can be selectively or simultaneously energized to indicate different states of an objective to be displayed.

According to a feature of the present invention two light-emitting elements, such as light-emitting diodes, of different colors are either selectively or simultaneously energized so that three different states can be represented by only two light-emitting elements, while the circuit arrangement is very simple.

According to another feature of the present invention, when the two light-emitting elements are arranged so that their light are mixed, one of three colors corrresponding to the original colors of the light-emitting elements and to a mixed color of the original colors can be selectively obtained in accordance with the magnitude of an input control signal.

In accordance with the present invention there is provided a circuit arrangement for different color light emission, comprising: first series circuit of a first light-emitting element having a given color, a diode and a resistor; and second series circuit of a second light-emitting element having another color and an active element, the active element being responsive to an input control signal so as to change a current flowing therethrough, the first and second series circuits being connected in parallel and interposed between two terminals of a power souce, the impedance of the first series circuit being selected to be much greater than that of the second series circuit when the active element is conductive.

BRIEF DESCRIPTION OF THE DRAWINGS

The object and features of the present invention will become more readily apparent from the following detailed description of the preferred embodiment taken in conjunction with the accompanying drawings in which.

The same or corrresponding elements are parts are designated at like reference numerals throughout the drawings.

DETAILED DESCRIPTION OF THE INVENTION

Figure 1:
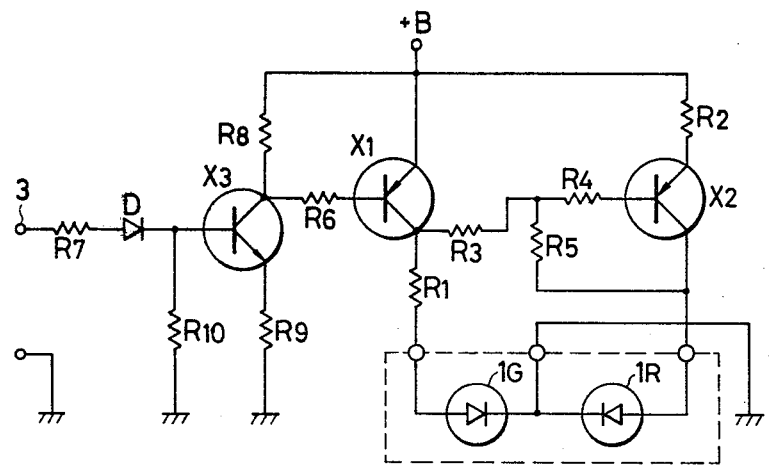
FIG. 1 is a circuit diagram of the conventional device.

Prior to describing a preferred embodiemnt of the present invention, the conventional device will be described with reference to FIG. 1 for a better understanding of the present invention. The conventional circuit of FIG. 1 comprises generally three transistors $X_1$, $X_2$ and $X_3$ and two light-emitting diodes (LEDs) 1G and 1R. The two LEDs 1G and 1R are arragned to emit respectively red and green light, and are embedded in a transparent or translucent package. The cathodes of the two LEDs 1G and 1R are connected to each other and a connecting point therebetween is connected to ground. The anode of the green LED 1G is connected via a resistor R1 to the collector of the first transistor $X_1$, which functions as a switching element, while the anode of the red LED 1R is connected to the collector of the second transistor $X_2$, which functions as a switching element. The emitter of the first switching transistor $X_1$ is connected to a positive terminal $+B$ of an unshown power source, and the emitter of the second switching transistor $X_2$ is connected via a resistor R2 to the terminal $+B$.

The collector of the first switching transistor $X_1$ is connected via a resistor network including three resistors R3, R4 and R5 to the base and collector of the second switching transistor $X_2$ so that bias is fed to the base of the second switching transistor $X_2$.

The base of the first switching transistor $X_1$ is connected via a base resistor R6 to the collector of a third transistor $X_3$ constituding a former stage, where the base of the third transistor $X_3$ is connected via a series circuit of a resistor R7 and a diode D to an input terminal 3 for receiving an input control signal. The collector of the third transistor $X_3$ is further connected via a resistor R8 to the terminal $+B$, while two bias resistors R9 and R10 are respectively interposed between the collector of the third transistor $X_3$ and ground and between the base of the same and ground.

The conventional circuit of FIG. 1 operates as follows: In the absence of an input control signal at the input terminal the third transistor $X_3$ is kept nonconductive causing the first switching transistor $X_1$ to be kept nonconductive. As a result, the green LED 1G is kept denergized. While the first switching transistor $X_1$ is kept nonconductive, the potential at the collector thereof is low, and thus bias is fed from the collector to the base of the second switching transistor $X_2$ to turn on the same. Accordingly, the second switching transistor $X_2$ becomes conductive to cause the red LED 1R to emit red light.

On the other hand, assuming an input control signal having a predetermined voltage is fed to the input terminal 3, the third transistor $X_3$ becomes conductive rendering the first switching transistor $X_1$ conductive. As a result, the green LED 1G is energized to emit green light. At this time the second switching transistor $X_2$ is turned off to denergize the red LED 1R. In this way, in the conventional circuit of FIG. 1, one of the red and green LEDs 1R and 1G can be selectively energized in accordance with the magnitude of the input control signal.

Figure 2:
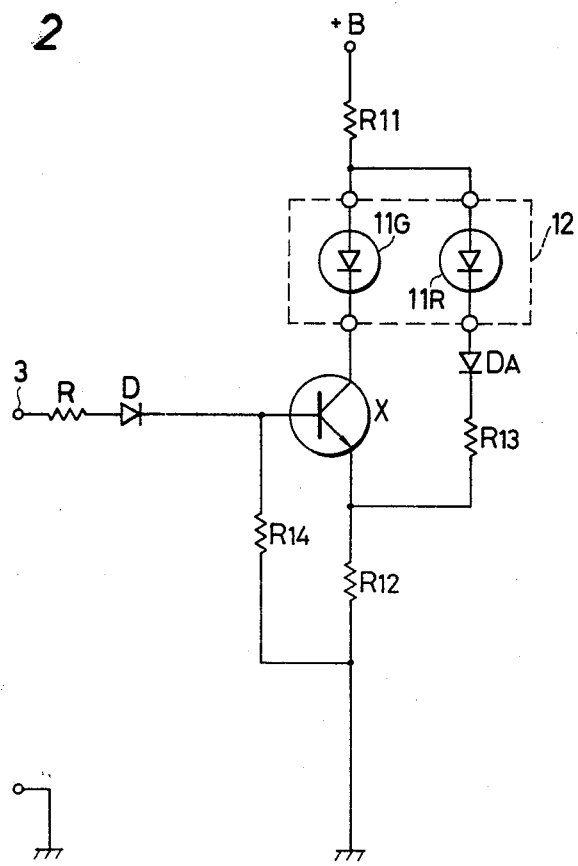
FIG. 2 is a circuit diagram of an embodiment of the present invention.

FIG. 2 illustrates a circuit diagram of an embodiment of the present invention. The circuit arrangement comprises generally two LEDs 11G and 11R and a single transistor X. A series circuit of a resistor R and a diode D is interposed between an input terminal 3 and the base of the transistor X. A resistor R14 is interposed between the base of the transistor X and ground, while another resistor R12 is interposed between the emitter of the same and ground for biasing the transistor X. The collector of the transistor X is connected to the cathode of the first LED 11G arranged to emit green light so as to constitute a series circuit. The cathode of the second LED 11R arranged to emit red light is connected to an anode of a diode $D_A$ whose cathode is connected to one end of a resistor R13 so that a series circuit of the red LED 11R, the diode $D_A$ and the resistor R13 is provided. These two series circuits respectively having the green and red LEDs are connected in parallel. In detail, the anodes of the red and green LEDs 11R and 11G are connected to each other and are further connected via a resistor R11 to a positive terminal +B of unshown power source, while the other end of the resistor R13 is connected to the emitter of the transistor X.

The electrodes of the two light-emitting diodes 11R and 11G are embedded in a transparent or translucent package as indicated by dotted lines 12 so that the electrodes of the red LED 11R is as close to the electrodes of the green LED 11G as possible. In the preferred embodiment, the electrodes of the red and green LEDs 11R and 11G are arranged side by side having a space of approximately 0.5 millimeter therebetween. Preferably, the package containing both the red and green LEDs 11R and 11G therein is made of a translucent material with which the emitted light is easy to diffuse so that two different color light will be readily mixed to produce orange, yellow or yellow-green light as will be describerd later. In the preferred embodiment, an epoxy resin is used as the material of the package 12.

The circuit of FIG. 2 operates as follows: When no input control signal is applied to the input terminal 3 or when the voltage of the input control signal applied thereto is below a predetermined voltage, the transistor X is kept nonconductive. Therefore, the green LED 11R connected in series with the transistor X is kept deenergized. At this time, the red LED 11R emits red light because of current flows via a passage of the terminal +B→the resistor R11→the red LED 11R→the diode $D_A$→the resistor R13→the resistor R12→ground. Namely, when the input control signal shows a low level, only the red LED 11R emits light.

Suppose that the voltage of the input control signal fed to the terminal 3 increases, a current starts flowing through the collector-emitter path of the transistor X. As the collector current increases, the green LED 11G starts emitting light, and the intensity of the green light increases as the voltage of the input control signal rises. As the current flowing through the green LED 11G increases, the current flowing through the red LED 11R decreases accordingly, resulting in decrease in intensity of the red light. Namely, both the red and green LEDs 11R and 11G are enerigized to respectively emit red and green light when the voltage of the input control signal is greater than the aforementioned or first predetermined voltage and is smaller than another or second predetermined voltage. If the red and green LEDs 11R and 11G are positioned side by side with a samll distance therebetween as described hereinabove, the red light and the green light are mixed to produce an orange, yellow or yellow-green light depending on the proportion of the intensity of the red light to the green light. Therefore, in the case that two color light rays are mixed, the mixed color changes from red→orange→yellow→yellow-green→greeen as the voltage of the input control signal rises.

When the voltage of the input control signal exceeds the second predetermined voltage, the transistor X becomes fully conductive to allow a current to flow through the green LED 11G, energizing the same. At this time, a negligibly small current flows through the red LED 11R because of the resistor R13. Namely, the total impedance of the series circuit of the red LED 11R, the diode $D_A$ and the resistor R13 is selected to be much greater than the impedance of the series circuit of the green LED 11G and the collector-emitter path of the transistor X, and therefore, the current flowing through the red LED 11R at this time is insufficient to enegize the same. The diode $D_A$ connected in series with the red LED 11R is employed for cancelling a voltage, such as 2 volts, generated across the green LED 11G when the green LED 11G is energized, because this voltage causes energization of the red LED 11R. With the provision of the diode $D_A$ the red LED 11R is prevented from being energized undesirably when it is intended to enerize only the green LED 11G.

The resistor R13 connected in series with the diode $D_A$ is employed for limitting the current flowing through the red LED 11R so that the intensity of the red light from the red LED 11R which is fully energized looks equal to that of the green light from the green LED 11G which is also fully energized. In other words, the resistor R13 is used to balance the intensity of red and green light because red LEDs emit stronger light than green LEDs when a predetermined current flows each of the red and green LEDs. In the above although the operation has been described in connection with a case of rising voltage of the input control signal, the mixed color light changes in a manner opposite to the above if the voltage of the input control signal lowers.

In the above although it has been described that the red and green LEDs 11R and 11G are embedded in a single package and are arranged side by side so as to produce mixed color light when both the LEDs 11R and 11G are energized, these two LEDs 11R and 11G may be separately arranged without being received in a common package. In this case the two LEDs 11R and 11G may be used to indicate different states of an object to be displayed as follows:

For instance, the light-emitting device according to the present invention may be used to indicate the magnitude of an audio signal in a stereophonic system, radio receiver or the like by representing a first level, which may be the lowest, with the red light from the red LED 11R, a second level with the red and green light from both the red and green LEDs 11R and 11G, and a third level with the green light from the green LED 11G. In this case, since the intensity of the red and green light continously changes when indicating the second level, the user may ascertain more precisely whether the objective signal level is rising or lowering. In the case that two color light rays are mixed to produce orange, yellow or yellow-green light, the second level may be represented by the mixed color light which varies continously from reddish color toward greenish color as the input signal singal level rises.

In the above-described embodiment it is assumed that only a single input control signal is fed to the input terminal 3 to control the energization of the two LEDs 11R and 11G. However, a plurality of like input terminals and associated series circuits of a resistor and a diode may be provided to be responsive to different input control signals, such as a singal indicating FM stereo receiving condition, a signal indicating a predetermined level of a received AM and/or FM broadcasting signal or the like, so that the two LEDs 11R and 11B are controlled by at least one of the input control signals.

From the foregoing it will be understood that the circuit arrangement according to the present invention requires a single active element, such as the transistor X or an FET (field effect transistor), for achieving selective energization of two different color light-emitting elements and simultaneous energization of the same. Consequently, a simple circuit can be readily provided with less manufacturing cost. Furthermore, since the number of parts used for constructing the circuit arrangement is much smaller than that in conventional devices, undesirable influence caused by variations among various elements is relatively small so that stable operation can be ensured.

The above-described embodiment is just an example of the present invention, and therefore, it will be apparent for those skilled in the art that many modifications and variations may be made without departing from the spirit of the present invention.

What is claimed is:

1. A circuit arrangement for different color light emission, comprising:
    (a) first series circuit of a first light-mitting element having a given color, a diode and a resistor; and
    (b) a second series circuit of a second light-emitting element having another color, and an active element, said active element being responsive to an input control signal so as to change a current flowing therethrough, said first and second series circuits being connected in parallel and interposed between two terminals of a power source, the impedance of said first series circuit being selected to be much greater than that of said second series circuit when said active element is conductive.

2. A circuit arrangement as claimed in claim 1, wherein said active element comprises a transistor arranged to be controlled by said input control signal.

3. A circuit arrangement as claimed in claim 1, further comprising a transparent or translucent package for receiving said two light-emitting elements.

4. A circuit arrangement as claimed in claim 1, wherein each of said two light-emitting elements comprises a light-emitting diode.

5. A circuit arrangement as claimed in claim 4, wherein the electrodes of said two light-emitting diodes are positioned side by side with a short distance therebetween.

6. A circuit arrangement as claimed in claim 3, 4 or 5, wherein said package is made of an epoxy resin.

* * * * *